(12) United States Patent
Christiansson (10) Patent No.: US 7,377,377 B2
(45) Date of Patent: May 27, 2008

(54) OVERHEAD CONVEYOR

(75) Inventor: Carsten Christiansson, Borås (SE)

(73) Assignee: OCS Overhead Conveyor System, AB, Boras (SE)

( * ) Notice: Subject to any disclaimer, the term of this patent is extended or adjusted under 35 U.S.C. 154(b) by 35 days.

(21) Appl. No.: 10/565,124

(22) PCT Filed: Jul. 2, 2004

(86) PCT No.: PCT/SE2004/001074

§ 371 (c)(1),
(2), (4) Date: Jun. 8, 2006

(87) PCT Pub. No.: WO2005/007542

PCT Pub. Date: Jan. 27, 2005

(65) Prior Publication Data

US 2007/0187212 A1 Aug. 16, 2007

(30) Foreign Application Priority Data

Jul. 22, 2003 (SE) .................................... 0302113
Jan. 30, 2004 (SE) .................................... 0400176

(51) Int. Cl.
*B61B 10/02* (2006.01)
*B61B 12/02* (2006.01)

(52) U.S. Cl. .................. 198/465.4; 198/867.13; 198/687.1; 104/172.4

(58) Field of Classification Search .......... 198/465.4, 198/687.1, 867.13; 104/172.4
See application file for complete search history.

(56) References Cited

U.S. PATENT DOCUMENTS 3,353,499 A * 11/1967 Sutherland .............. 104/172.4
3,377,962 A * 4/1968 Dehne ..................... 104/172.4
3,807,314 A * 4/1974 Siemmons ............. 198/370.13
3,889,606 A * 6/1975 Linton ..................... 104/172.4
4,031,829 A * 6/1977 Bell et al. ................ 104/172.4
4,073,237 A * 2/1978 Wakabayashi .......... 104/172.5
4,354,435 A * 10/1982 Wakabayashi .......... 104/172.4
4,428,299 A * 1/1984 Wakabayashi .......... 104/172.4

(Continued)

FOREIGN PATENT DOCUMENTS

DE 23 59 267 6/1975

(Continued)

OTHER PUBLICATIONS

International Search Report dated Nov. 4, 2004 for corresponding International Application No. PCT/SE2004/001074.

(Continued)

*Primary Examiner*—Mark A. Deuble
(74) *Attorney, Agent, or Firm*—Harness, Dickey & Pierce, P.L.C.

(57) ABSTRACT

The invention relates to an overhead conveyor of the type that comprises at least one drive carriage (13) which is drivably arranged in a girder system and from which load-holding means (18) are suspended, and where the girder system comprises an elongate straight box girder (9) having a first inner space with rails (12) for the drive carriage (13) and a second elongate inner space comprising a driven endless belt (5, 6) with means (23) to be drivingly connected to the drive carriage.(13).

12 Claims, 12 Drawing Sheets

U.S. PATENT DOCUMENTS

| | | | |
|---|---|---|---|
| 6,279,735 B1 | 8/2001 | Davidsson et al. | |
| 6,357,574 B1* | 3/2002 | Eberle et al. | 198/465.4 |
| 6,431,347 B1 | 8/2002 | Gossner | |
| 6,554,127 B1* | 4/2003 | Kroll | 198/465.4 |
| 2003/0079641 A1 | 5/2003 | Johnson et al. | |

FOREIGN PATENT DOCUMENTS

| | | |
|---|---|---|
| DE | 19538350 | 4/1997 |
| GB | 737265 | 9/1955 |
| SE | 501744 | 5/1995 |
| WO | WO 99/33721 | 7/1999 |

OTHER PUBLICATIONS

International Preliminary Report on Patentability dated Nov. 18, 2005 for corresponding International Application No. PCT/SE2004/001074.

* cited by examiner

OVERHEAD CONVEYOR

The present invention relates to overhead conveyors of the type that comprises at least one carriage which is drivably arranged in a superjacent girder system and from which load-holding means are suspended. In one embodiment, the drivable carriage is propelled by a threaded spindle which extends in the conveying direction and is adapted to cooperate with a driven part of the carriage. Such a conveyor gives a number of advantages of which the maybe most important one is that the available floor space need be used for the conveyor to a very small extent only.

However, it is a disadvantage that such conveyor tracks can only be arranged in a main direction, and branchings, curve portions etc often require manual actuation, which means that automation will suffer.

In an overhead conveyor according to SE 501,744 C2, it is possible to provide, without difficulties, automatic switch to branches, driving through sharp bends and even temporary disengagement from driving of individual movable carriages, and this is achieved by the spindle being provided with alternately threaded drive portions and smooth, non-driving portions, and by said movable carriages each consisting of two carriages combined to a unit, at a distance from each other corresponding to the length of the threaded portions of the spindle, whereby a unit consisting of two carriages, during driving, is in driving engagement with driving portions of the spindle adjacent to one of the two carriages included in the unit.

This construction has been found to function in a satisfactory manner, but owing to the presence of the driving helical spindle it constitutes a fairly expensive solution while at the same time it is not particularly flexible.

The object of the present invention therefore is to provide an overhead conveyor that satisfies the positive features of the above-mentioned worm screw drive conveyor and besides is considerably less expensive and more flexible than this, which has been achieved by the overhead conveyor being given the features that are stated in claim 1.

The invention will now be described in more detail with reference to an embodiment which is schematically illustrated in the accompanying drawings.

Figure 1:
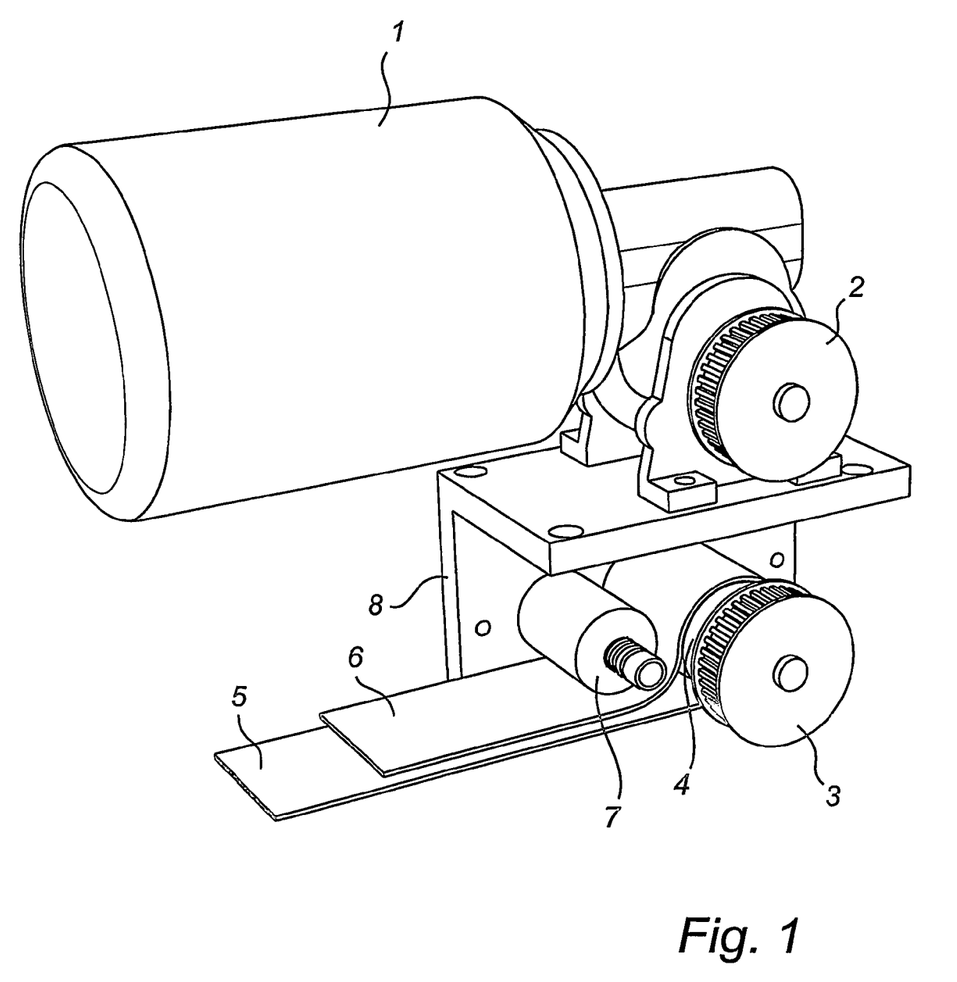
FIG. 1 is a perspective view of a portion of the drive for the conveyor according to the invention.

FIG. 1 is a perspective view of a portion of one embodiment of the drive of the conveyor according to the invention, schematically illustrating a drive motor 1 driving a first gear drive 2, which via a positive drive belt (not shown) transfers the drive force to a second gear drive 3, which in turn is non-rotatably connected to a drive and/or terminal roller 4, which drives an endless drive element in a driving run 5 and a return run 6. The drive element is here a drive belt which is kept tensioned by means of tensioning rollers 7. Alternative drive elements are chains, positive drive belts etc. This drive package is attached to a frame yoke 8 which is partially shown in the Figure.

Figure 2:
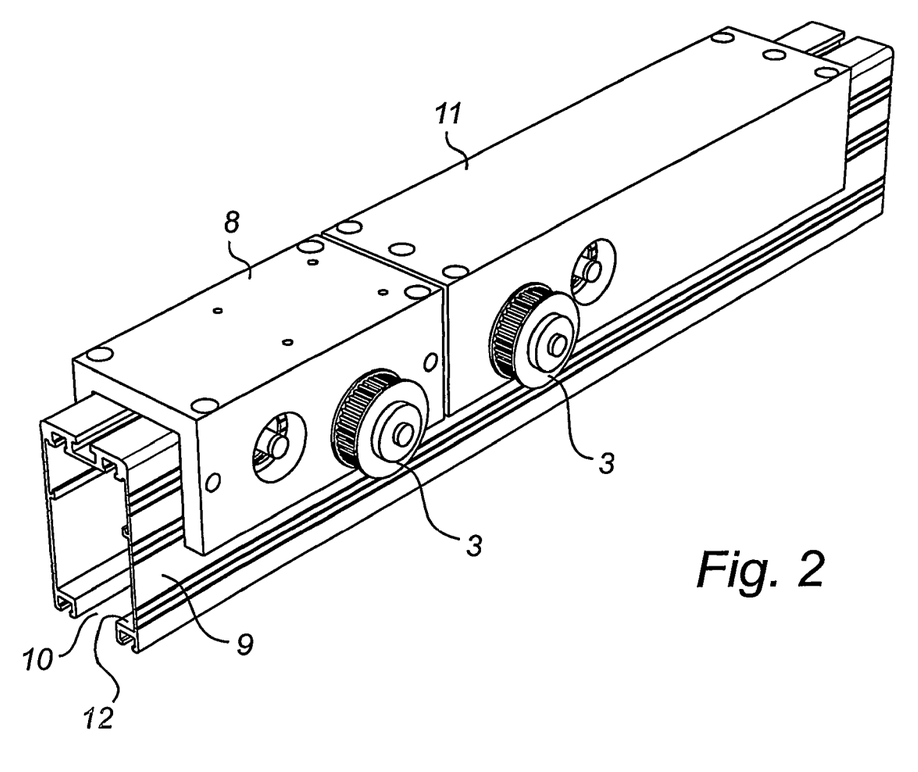
FIG. 2 is a perspective view of a portion of a main girder included in the conveyor.

FIG. 2 shows schematically a portion of an elongate girder 1 which is included in the inventive conveyor and which is designed as a hollow box girder 9 of square cross-section with a longitudinal, centrally arranged slot-like opening 10 which in the mounting position is positioned in the downwardly directed lateral surface. The frame yoke 8 supporting the motor (not shown) and the second lower gear drive 3 is fixed to the upper side of the girder 9. The frame yoke 8 straddles the girder 9, and the Figure shows a second similar frame yoke 11 fixed to the girder 9 in the axial direction after the first and, like this, provided with a gear drive 3 and drive and/or terminal rollers (not shown) and also a second endless belt loop. By arranging a positive drive belt between the two gear drives 3, the motor 1 can (according to FIG. 1) drive the first as well as the second belt loop. In this manner, it is possible to keep the length of each belt loop within such limits as to make the slack thereof reasonable.

Figure 3:
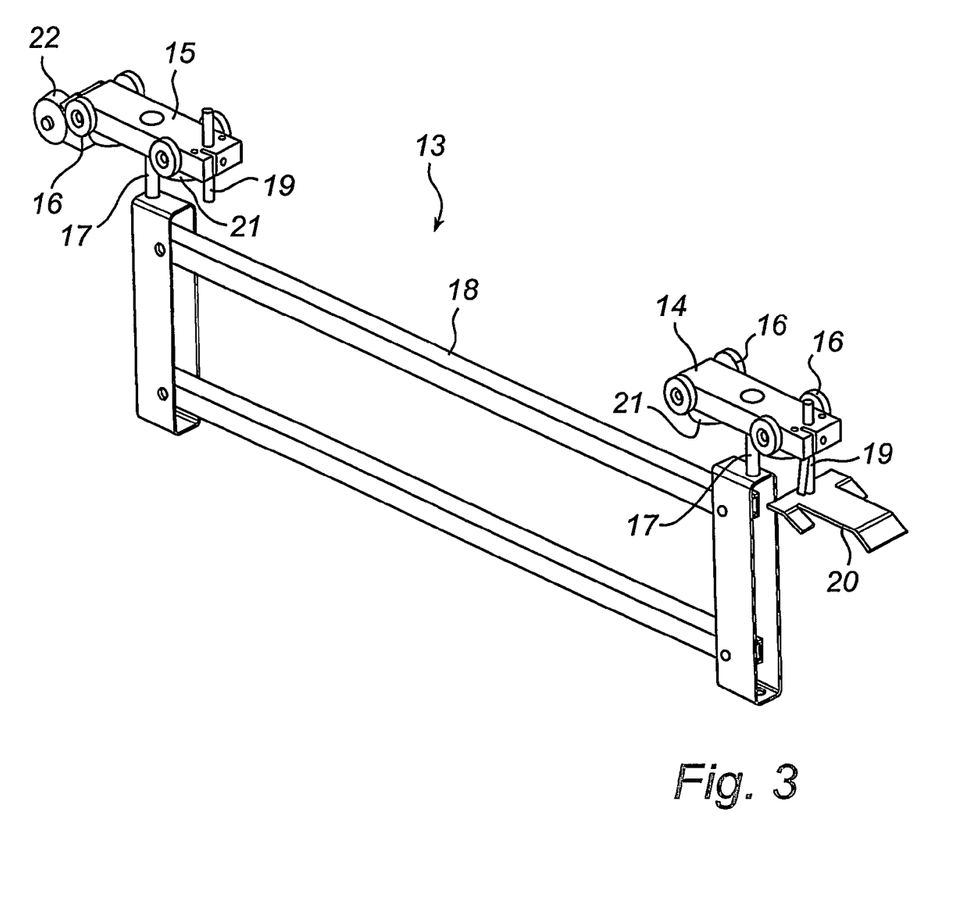
FIG. 3 is a perspective view of a movable drive carriage included in the conveyor.

At the lower slot-like opening 10 in the girder there are arranged inwardly directed flange portions 12 which serve as rails for wheels of a drive carriage 13 schematically shown in perspective in FIG. 3, comprising a front carrier 14 and a rear carrier 15, which each in the shown example are provided with four wheels 16 which thus are to roll on the flange portions 12 shown in FIG. 2. Each of the front and rear carriers 14, 15 is provided with downwardly extending load carrier pins 17 which, when the drive carriage 13 is arranged in the girder 9, extend through the slot-like opening 10 and are interconnected by a frame 18 which in the shown example is quadrilateral, whereby the carriers 14, 15 are held at a constant distance from each other. Each carrier is also provided with a vertically arranged preloaded driver, here in the form of a finger or pin 19, the construction and function of which will be described in more detail below.

On the front carrier 14, the driver 19 is in its lower part provided with a partially ramp-shaped forwardly projecting driver plate 20. Both carriers 14, 15 are provided with guide rollers 21 which in the girder 9 rest against the inner wall thereof and thus prevent the drive carriage 13 from being set into lateral oscillations in the girder. In the rear part of the rear carrier 15 there is also arranged a pressing roller 22 adapted to cooperate with a carrier plate of a subsequent drive carriage in a manner that will be described in more detail below.

Figure 4:
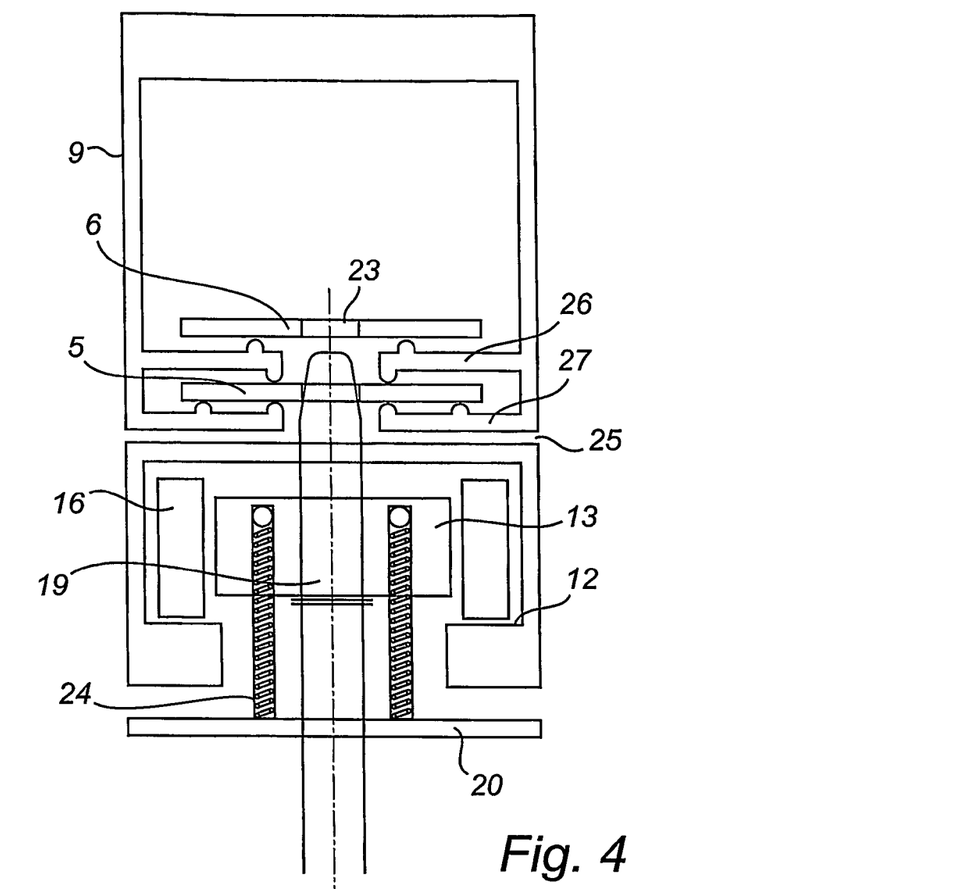
FIG. 4 is a schematic cross-sectional view of a girder with drive belt and drive carriage.

FIG. 4 is a schematic cross-section of a girder 9 where the driving run 5 of the drive element and its return run 6 are illustrated. The drive element, which here is a drive belt, is provided with a number of through holes 23 and the driver pin 19 of each carrier is arranged to extend through such a hole 23 in the lower driving belt run 5, whereby the entire drive carriage 13 will accompany the movement of the belt, until the driver pin is disengaged from the hole 23, whether this occurs by the belt reaching a terminal roller and thus being removed from its contact with the pin, or the pin 19 pretensioned by springs 24 is pulled downwards by being actuated by its driver plate 20. In the view shown, the girder is intended for a switch portion which will be described in more detail below and where the girder therefore is divided along a horizontal line 25. In the portion above this dividing line there are the belt runs 5, 6 and the drive rollers 4 and the gear drives 3 (not shown) while in the lower part there is the drive carriage 13 and its components. In this embodiment, belt supports 26, 27 for vertical guiding of the belt runs 5, 6 are arranged in the upper part of the girder 9.

Figure 5:
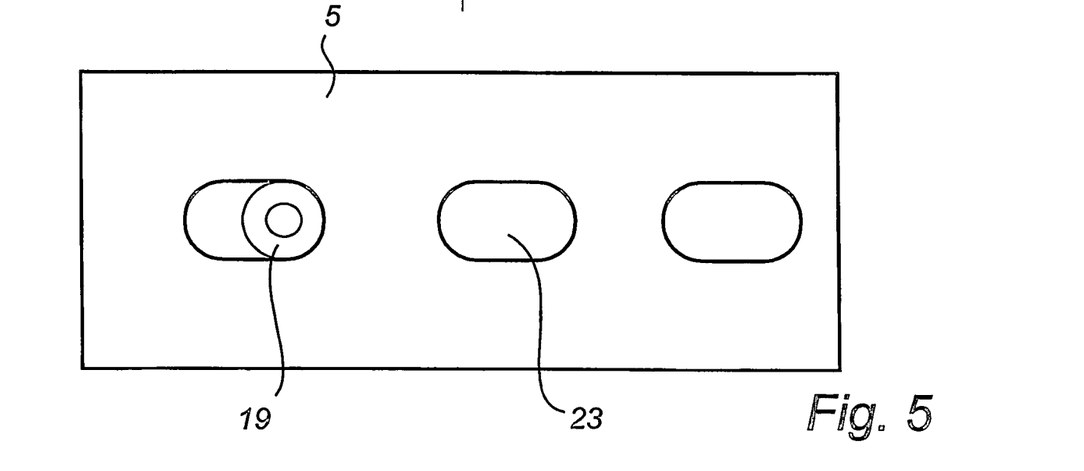
FIG. 5 is a top plan view of a portion of a drive belt included in the conveyor.

FIG. 5 is a top plan view of a portion of the belt in FIG. 4, in which it is to be seen that the holes 23 therein are preferably not circular, but elongate and oval to provide greater flexibility when the driver pin 19 is to be engaged in a hole.

Figure 6:
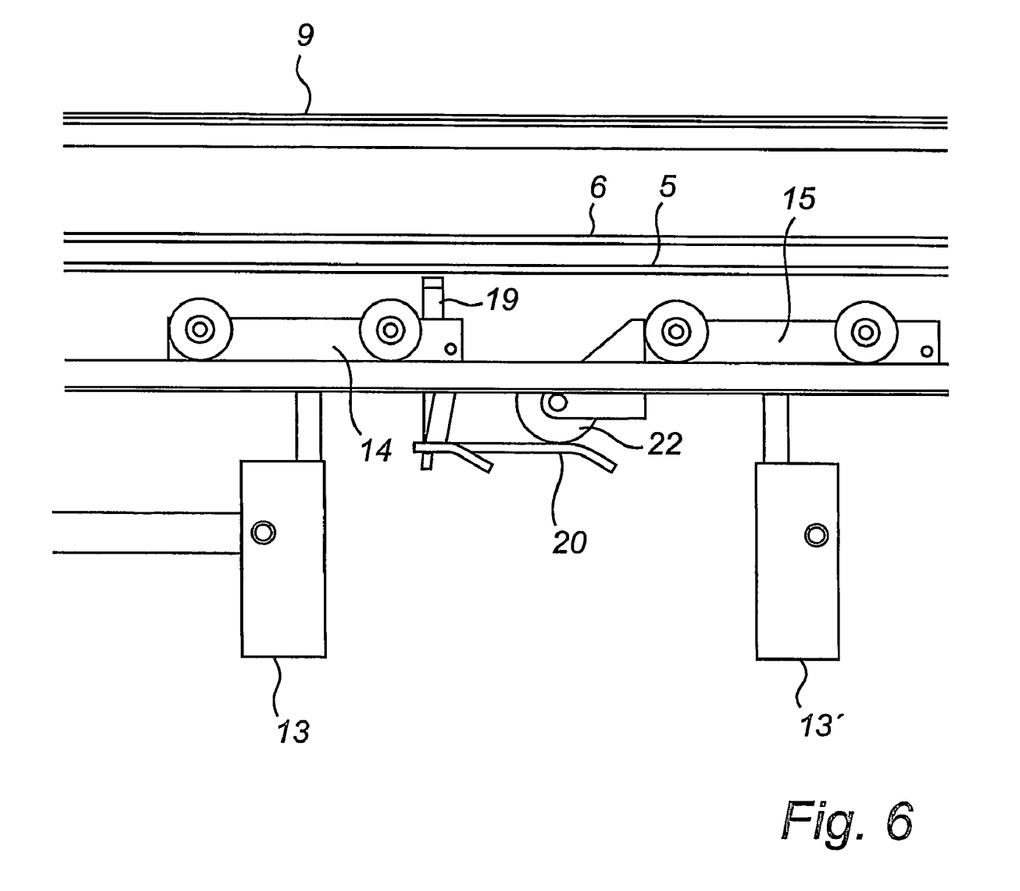
FIG. 6 is a schematic cross-section of part of a girder with portions of two drive carriages disconnected from driving.

FIG. 6 is a schematic view of a girder 9 in which the front carrier 14 of a rear drive carriage 13 has caught up with a rear carrier 15 of an anteriorly situated drive carriage 13'. The anteriorly situated drive carriage 13' may have stopped because the driver pin 19 has been disengaged from the driving belt run 5. When the driver plate 20 of the rear drive carriage 13 reaches the pressing roller 22 of the anteriorly situated drive carriage 13', the spring bias of the driver pin 19 will be overcome and the pin moves downwards, so as to be disengaged from the drive belt 5. In this way, a number of drive carriages may be collected for shunting purposes, without requiring the belt drive to be stopped.

Figure 7A:
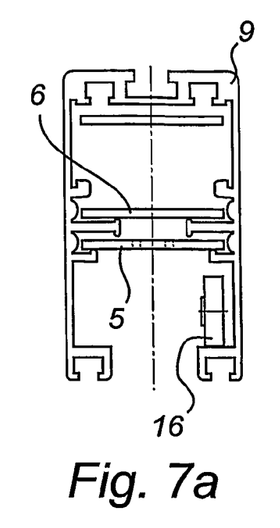
FIGS. 7*a-c* are end views of the main girder 9 included in the conveyor according to the invention, in different portions along the extent of the conveyor track.

FIG. 7a is a cross-sectional view of an entire girder 9 with both runs 5, 6 of the drive belt and with a wheel 16 schematically shown in the lower part of the girder. A girder of this cross-section is used for straight driven portions of the conveyor track.

Figure 7B:
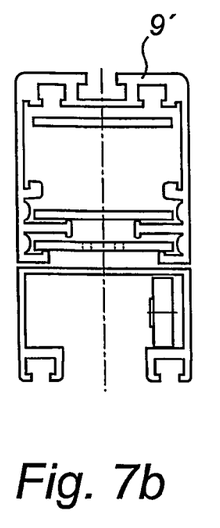

FIG. 7b is a cross-section of an entire girder 9, which is divided in the manner illustrated in FIG. 4, said girder type being used at switching points.

Figure 7C:
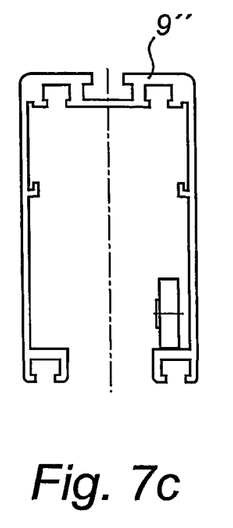

FIG. 7c shows another girder type 9' which is intended for parts of the conveyor track where there is no drive of the drive carriage.

Figure 8:
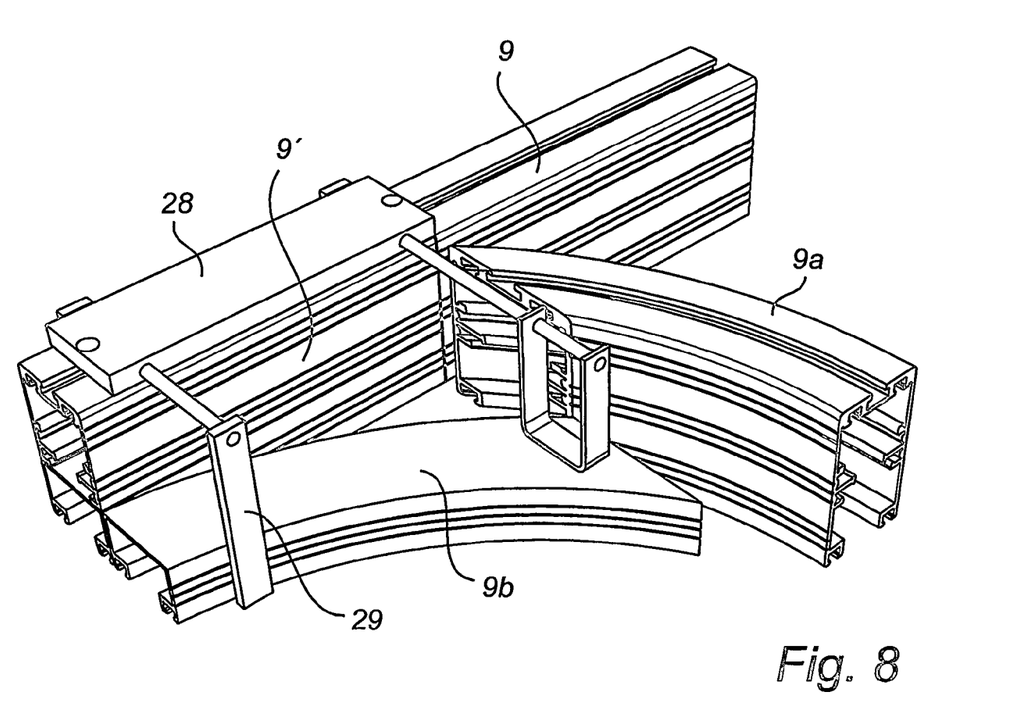
FIG. 8 is a perspective view of part of the girder system of the conveyor to perform switching from the main track of the conveyor to a branch track.

FIG. 8 illustrates a portion of a switching point in perspective. At this switching point, there is arranged a straight girder part 9 corresponding to the one according to FIG. 7a, which continues straight on after the switching point. A branched, curved girder 9a also connects to the switching point and is, in the example shown, of the same cross-section as the girder in FIG. 7a, but the girder 9a could also have the cross-section shown in FIG. 7c. Moreover, at the switching point there is arranged a girder 9' which is of the cross-section shown in FIG. 7b. In a plate 28 attached on top of the girder 9' there is a guide for a tie rod 29, by which the lower part of the girder 91 can be displaced to the left in the Figure, while at the same time a curved lower girder part 9b is pulled in so that its front end will be aligned with the upper part of the girder 9' while its rear end will be exactly aligned with the front end of the curved girder 9a.

At a switching point of this type, the drive carriage can pass straight on, i.e. from the girder 9' to the girder 9 when the girder 9' is in the shown position. However, when the lower part of the girder 9' has been displaced in the lateral direction and replaced by the girder part 9b, the front carrier of the drive carriage will by means of guide strips (not shown) or the like, which can be actuatable manually or by remote control to achieve that the driver pin is disconnected from the drive belt, by these strips being made to actuate the spring-biased driver pin 19 so as to be disengaged from the hole 23 in the drive belt. Now the carrier positioned in the lower part of the girder and disconnected from the drive belt, which continues straight on in the upper part of the girders 9' and 9, can follow the curved track described by the girder part 9b. By the rear carrier 15 of the drive carriage being located a distance behind the front carrier 14, the rear carrier will still be engaged by its driver pin 19 in a hole 23 in the drive belt and thus move the front carrier into the track 9b. After the girder 9a together with the girder 9b there is a girder portion (not shown) with a new drive of a corresponding drive belt extending in the new direction, and by the guide strip here being eliminated, the springs 24 of the driver pin will again press the driver pin 19 upwards into driving engagement in a hole 23 in the new drive belt in the new direction. When the rear carrier of the drive carriage reaches the guide strips in the disconnected portion, the rear carrier will correspondingly be disconnected from the first drive belt and "follow" the first carrier in the new direction.

Figure 9:
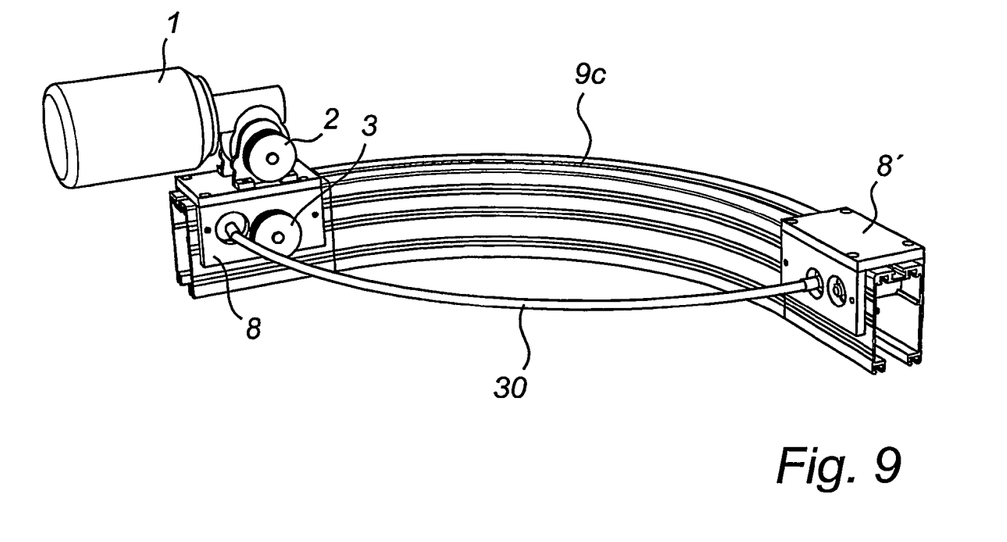
FIG. 9 is a schematic view of the design of a curve for a conveyor according to the invention.

FIG. 9 illustrates the drive in connection with the girder 9c being bent in a curve. Like in FIG. 1, there is a drive motor 1 which via a positive drive belt (not shown) transfers its drive force to drive a drive belt by means of the gear drives 2, 3.

It is obvious that the drive belt cannot follow the curvature of the girder, but one drive belt ends where the first frame yoke 8 is positioned, and after the curve there is a second frame yoke 8' which, of course, can support a motor for driving a new belt portion, but as illustrated in the Figure can also be driven by a flexible shaft 30 extending between the two frame yokes 8, 8' and thus transferring drive force from the motor 1 of the first frame yoke 8.

Like in connection with switches as described and illustrated with reference to FIG. 8, there is thus a distance where one carrier of the drive carriage has no drive, and this implies, of course, that the distance between two such drive rollers for the drive belts is not allowed to be greater than to allow always one of the carriers of the same drive carriage to be engaged with a driving belt.

Figure 10:
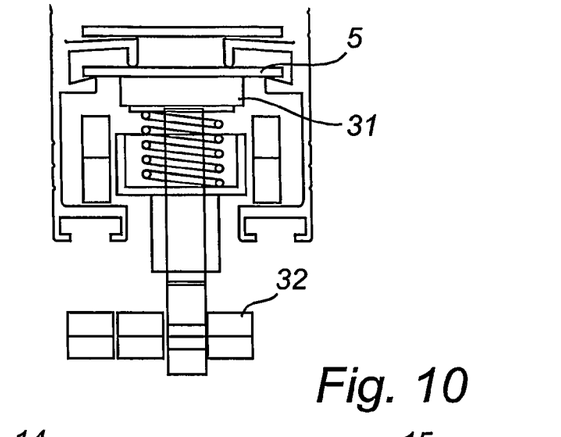
FIG. 10 shows a carriage with an alternative embodiment of a driver.

In an alternative embodiment of the carrier 14, 15, as shown in FIG. 10, the driver is not a pin 19 but a friction driver 31. This has an essentially flat upper surface adapted to be brought into frictional engagement with the drive element. In this case, the drive element is preferably formed with an essentially flat surface facing the carriage and consists, for instance, of a belt or a positive drive belt.

Since the necessary movement to bring the friction driver 31 out of contact with the drive element is smaller than in the construction shown in FIG. 4, the disconnecting function of the carriage in FIG. 10 can advantageously be designed in a slightly different way.

Figure 11:
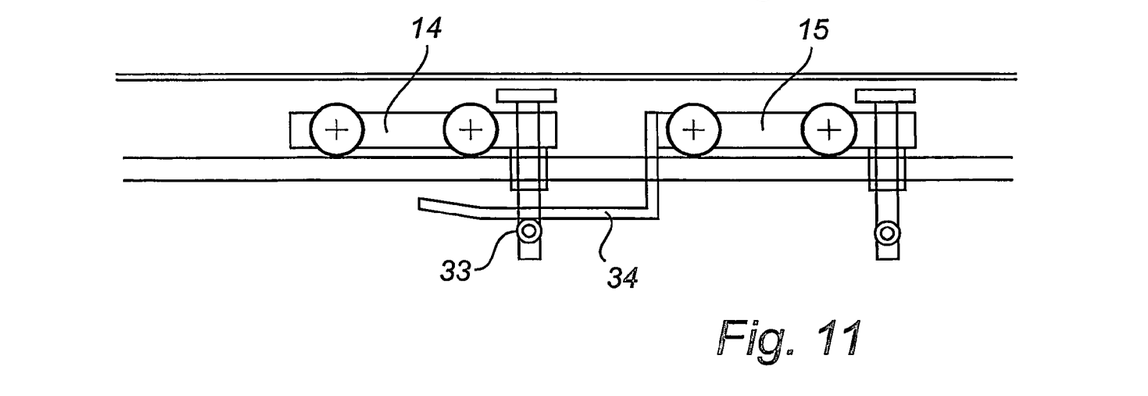
FIG. 11 shows disconnection of the carriage in FIG. 10.

The lower part of the friction driver 31 is, at least on one side, provided with projecting portions 32 which extend transversely to the conveying direction. The portions can be provided with rolls 33 or other friction-reducing means. As shown in FIG. 11, moreover the rear carrier 15 of each drive carriage is provided with a fork-like depressing means 34, the ends thereof being bent slightly upwards. When two carriers approach each other, the ends of the fork 34 grasp one or both sides of the lower part of the driver 31 and force the projecting portions 32, and thus the entire driver, downwards.

It should be noted that the shown two embodiments of drive exhibit different properties. While a pin 19 engaging in a hole 23 in the drive element results in great transmission of forces, and a well-defined movement, it implies at the same time that outer forces that act on a carriage are propagated directly to the drive. The friction driver 31 results on the other hand in a smaller and less precise movement, but allows at the same time a certain possibility of sliding, if for instance a carriage bumps into something.

Figure 12A:
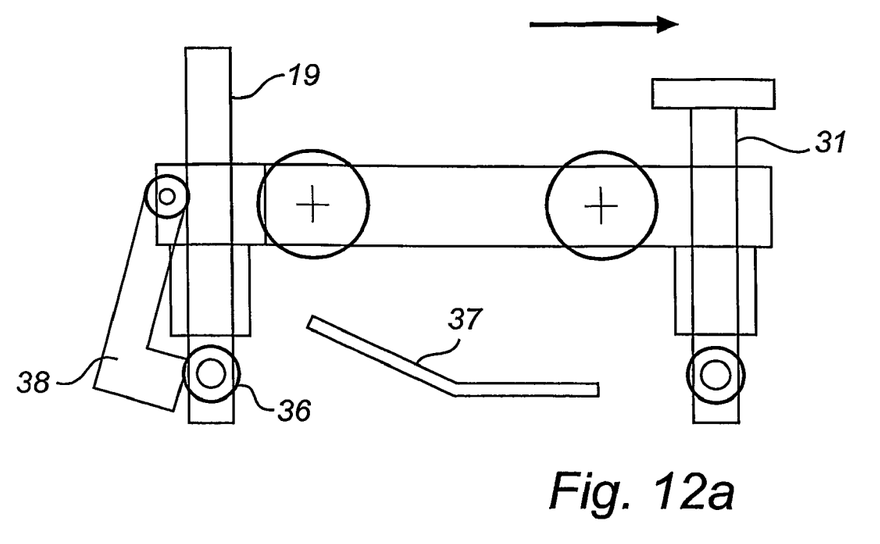
FIG. 12 shows a carrier with two different drivers.
Figure 12B:
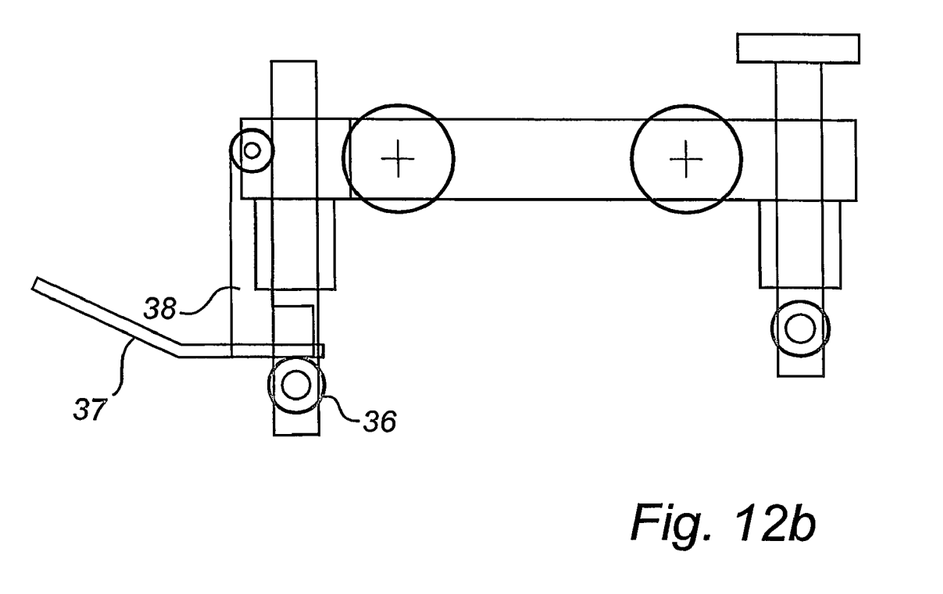
Figure 13:
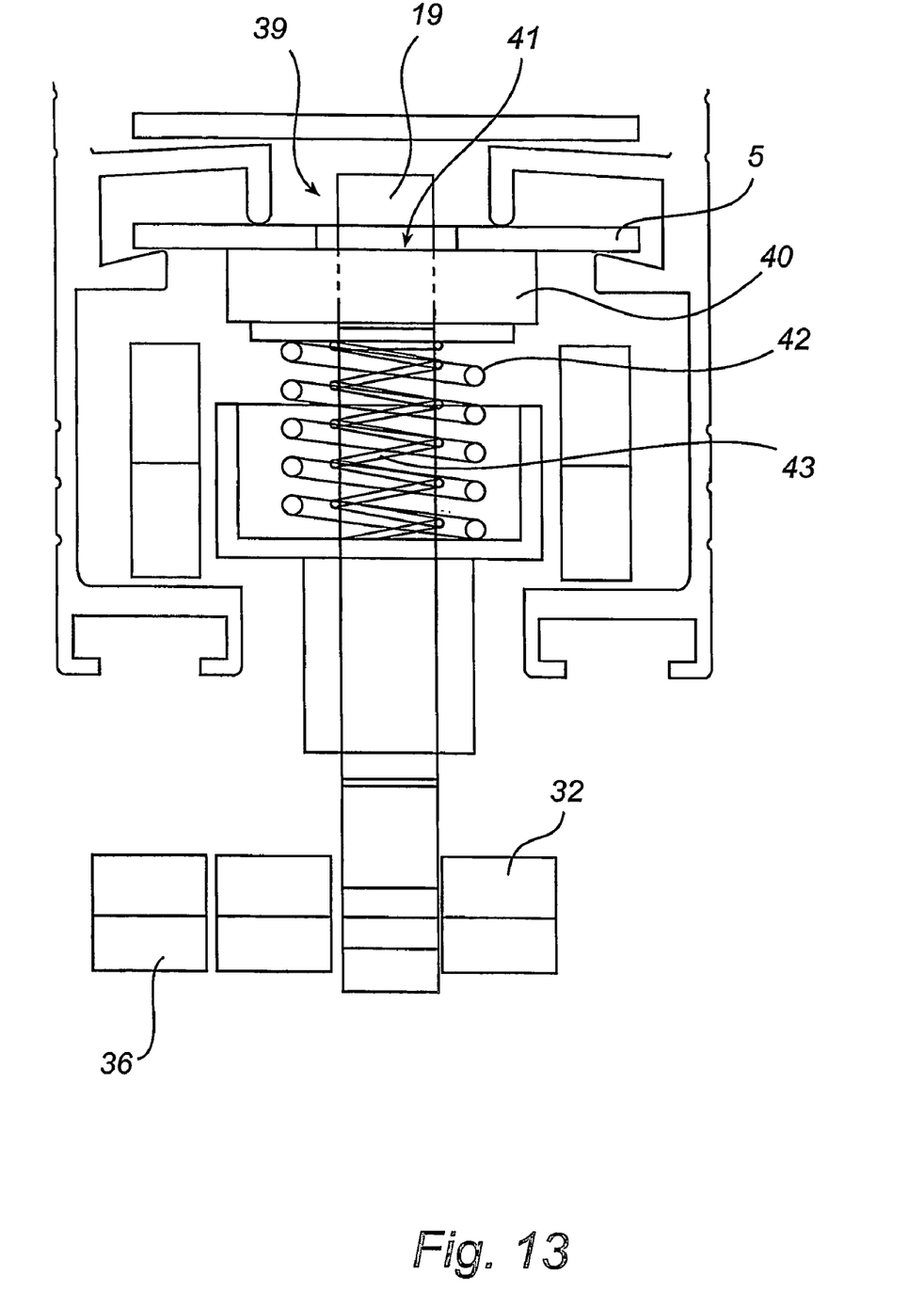
FIG. 13 shows a driver involving another embodiment of a driver.

In a preferred embodiment of the invention, each carriage is therefore provided both with a driver pin 19 adapted to be inserted in a hole 23 in the drive element, and a friction driver 31 as illustrated in FIGS. 12 and 13.

In FIG. 12, the carriage has two separate, spring-loaded drivers 19 and 31. One of these, for instance the rear one, consists of a carrier pin 19, while the other, for instance the front one, consists of a friction driver 31. Both drivers 19 and 31 can be engaged with and disengaged from the drive element 5.

The pin 19 is preferably in its lower part provided with projecting portions 36 in the same way as shown in FIG. 10, but extends, at least on one side, further away from the pin 19. A guide means 37 intended for the purpose, such as an inclined rail extending along a distance of the track, can be arranged to force, in cooperation with the portion 36, the pin 19 downwards and bring it out of contact with the drive element. Since the portion 36 extends further away from the pin 19 than the portions 32 of the friction driver, the guide means 37 can be adjusted not to actuate the friction driver 31. Conveniently the carriage is in connection with the pin 19 provided with a locking means 38, such as a hook, which can hold the pin 19 in a depressed position when the guide means 37 has been passed. The friction driver 31 can be disconnected, as described above with reference to FIG. 11.

In another embodiment, the driver 39 is a combination of pin 19 and friction driver 31. The friction driver 31 consists of a plate 40 provided with a hole 41, through which the pin 19 can run. The plate 40 is pressed by a spring 42 towards the drive element 5. Another, smaller spring 43 contained inside the spring 42 exerts a load on the pin 19. The plate 40 is in contact with the driver lower part which is provided with projecting portions 32 which can be used to press down the plate 40 out of contact with the drive element.

If the plate is in contact with a smooth drive element, such as a drive belt, the pin 19 will be held on the same level as the plate 40, in engagement with the drive belt. If, on the other hand, the drive element has recesses, such as holes in a belt, or a distance between links in a chain, the pin will be pressed by the spring 43 up through the recess and thus engage the drive element.

In a case where it is not desirable for the pin to continuously engage the drive element, the lower part of the driver can instead be connected to the pin 19, in another embodiment (not shown). The pin 19 can then be provided with a flange adapted to engage the plate as the pin 19 is being pressed down a distance. This means that the arrangement has three different operational positions. In a first position, both the pin 19 and the plate 40 are pressed upwards by their respective springs 42, 43, the plate in contact with the drive element 5 and the pin in engagement with a possible hole 23. In a second position, the pin 19 has been pressed down by being actuated by the portions 32 and brought out of contact with the hole 23. However, the plate 40 is not affected by this movement and is held in contact with the drive element 5 by the spring 42. In a third position, the pin 19 has been pressed down yet another distance, so that the flange has engaged the plate and, while moving, brought this along. Thus, also the friction driver has lost contact with the drive element 5, and the carriage is completely disconnected.

Figure 14:
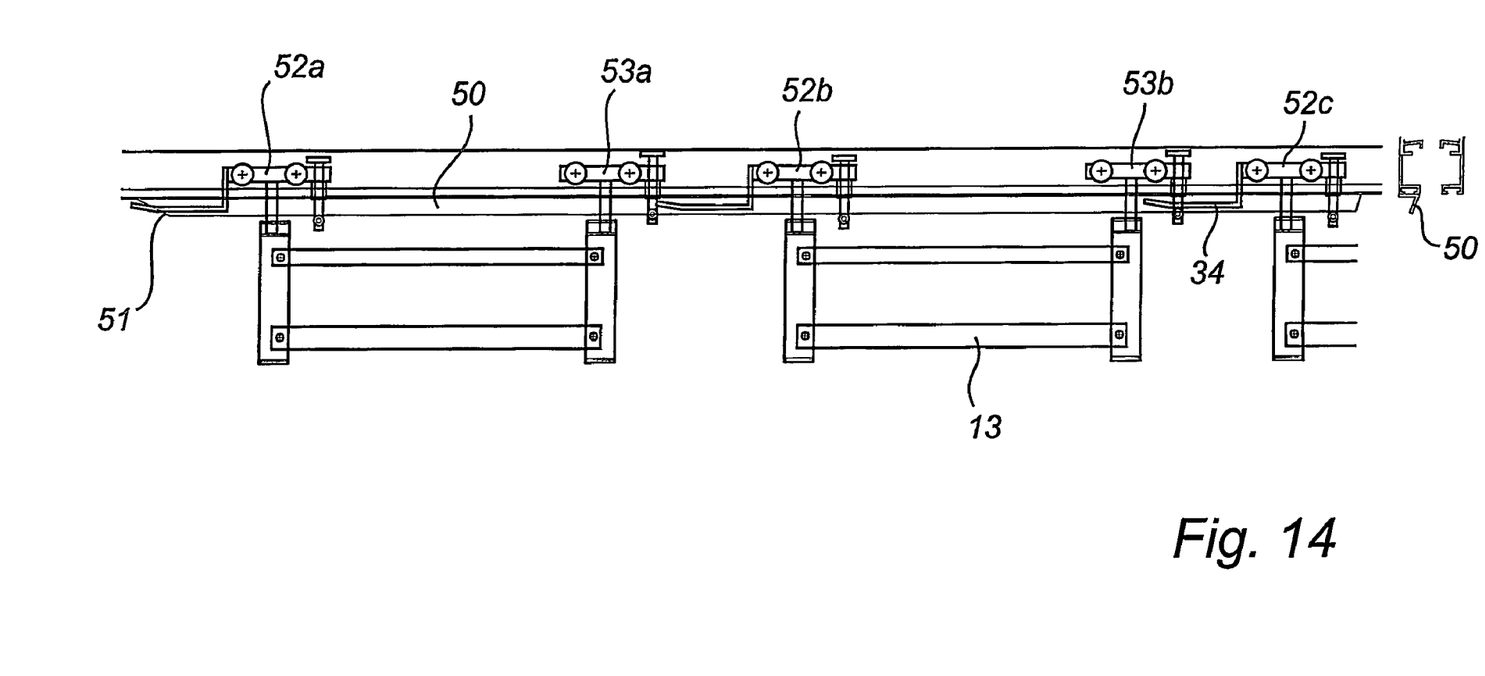
FIG. 14 shows disconnection of carriages according FIG. 13.
Figure 15:
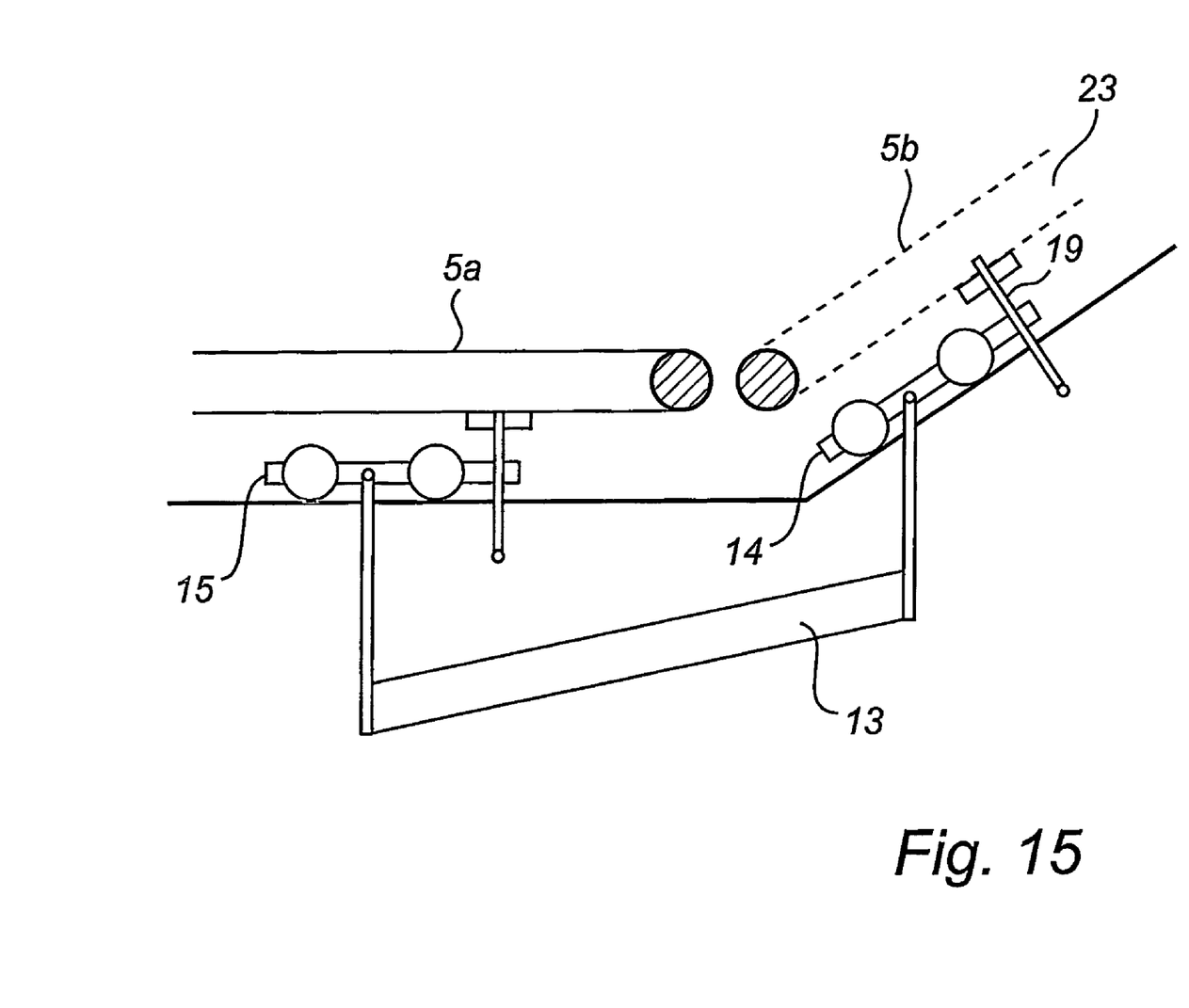
FIG. 15 shows a system of different types of drive element.

The most projecting portion 36 can be used for a disconnecting mechanism as shown in FIG. 14. The rear carriages 52a, b, c are here of the type as shown in FIG. 13, while the drivers of the front carriages 53a, b are without the peripheral portion 36. Along the part of the track where disconnection is to occur, a rail 50 is arranged under the track to engage the portion 36. The rail has a bevelled edge 51.

In the same way as described above with reference to FIG. 12, the edge 51 of the rail will press down the drivers of the rear carriages 52a, b, c while the front carriages 53a, b continue driving. When a front carriage 53b is made to run against a stationary rear carriage 52c, the depressing means 34 of this stationary carriage will cause disconnection of the front carriage 53b, whereby the entire drive carriage 43 is disconnected.

With regard to the different properties of the driving principles (a pin in engagement with a hole and friction, respectively), it may be convenient to use a flat drive element 5a along essentially flat portions of the drive track, and also a drive element 5b, provided with holes, along sloping portions. This is shown in FIG. 14, where carriages of the type shown in FIG. 13 (combined driving arrangement) are used.

The pin 19 will along the drive element 5a abut against the drive element without making engagement. In the transition to the drive element, the pin will be raised so as then to be pressed down again by the deflecting roller. Subsequently the friction driver will again drive the carriage by frictional engagement with the drive element 5b. Since the track is here sloping, it is however possible that the friction driver cannot on its own transfer sufficient forces to propel the carriage. The drive belt 5b will then slide, until the next hole 23 passes the pin 19, which is then pressed up in engagement with the hole and takes over propulsion.

The invention is not restricted to the embodiments illustrated in the Figures and described in connection therewith, and modifications and variants are possible within the scope of the appended claims. Thus, the girder 9 in the form of a box girder has been shown to have an upper inner space that holds the drive belt, while the inner space for the carriers of the drive carriage is positioned under the upper space. However, the drive belt space could also be placed beside the space for the carriers, in which case, however, the carrier pins would be arranged horizontally.

The invention claimed is:

1. An overhead conveyor comprising
an elongate straight box girder having a first inner space with rails and a second elongate inner space comprising an endless driven drive element,
a drive carriage comprising a front carrier and a rear carrier which are arranged in a fixed spaced-apart relationship in the longitudinal direction of the girder and adapted to run on said rails,
each carrier being provided with at least one friction driver preloaded to be pressed towards engagement with the drive element so as to transfer drive to the drive carriage,
wherein each driver in its lower part has projecting portions adapted, in cooperation with a guide means, to be able to move the driver out of engagement with the drive element,
that the conveyor further comprises a fixedly arranged guide rail arranged to cooperate with the projecting portion of the rear carrier as the carrier passes the guide rail, and
that the rear carrier is provided with a depressing means adapted to cooperate with the projecting portion of the front carrier, for the purpose of being able to accumulate a number of drive carriages in the girder system, along said rail.

2. An overhead conveyor according to claim 1, wherein said projecting portions of the drive, in the front carrier of a drive carriage, are formed as a ramp-shaped inclined drive plate, while said depressing means of the rear carrier are formed as a rearwards projecting pressing roller which is adapted, in contact with the ramp-shaped driver plate of a subsequent drive carriage, to force its driver to be disconnected from the drive element.

3. An overhead conveyor according to claim 1, wherein said projecting portions of the driver, in the front carrier of a drive carriage, are provided with friction-reducing means, while said depressing means of the rear carrier are a ramp-shaped and inclined, and adapted, in contact with the projecting portions of a subsequent front carrier, to force its driver to be disconnected from the drive element.

4. An overhead conveyor according to claim 1, wherein the drive element has an essentially flat surface, and at least one driver is provided with an essentially flat upper surface, adapted to be brought into frictional engagement with the essentially flat surface of the drive element.

5. An overhead conveyor according to claim 1, wherein the girder system is made up of straight portions and curved portions, each curved portion having a second elongate inner space without a drive element, said curved girder portions being shorter than the distance between two carriers of the same drive carriage to allow a front carrier of a drive carriage, which is moved into a curved girder portion, to be moved by the engagement of the rear carrier with the drive element of the preceding straight girder portion, through the curved girder portion and into a subsequent straight girder portion and there come into engagement with the drive element in this subsequent girder portion.

6. An overhead conveyor according to claim 1, wherein switching points are connectable in the girder system, said switching points having a straight girder connectable to a first straight girder and provided with a space having rails for carriers which is movable away from the girder space with the drive element, and with a second curved girder portion which, during movement of the above-mentioned space, at the same time is positioned in contact with the first straight girder and with a subsequent curved girder portion.

7. An overhead conveyor according to claim 1, wherein the guide means is movable arranged to be able to actuate, manually of by remote control, the driver to perform disconnection of the drive for a carrier.

8. An overhead conveyor according to claim 1, wherein said guide rail is arranged to cooperate with a peripheral part of said projecting portions, while a depressing means is adapted to cooperate with an inner part of said projecting portions.

9. An overhead conveyor according to claim 1, wherein the drive element is provided with a number of through holes, and wherein each carrier is provided with a driver comprising a friction driver as well as movable pin adapted to be engaged with and disengaged from the holes in the drive element.

10. An overhead conveyor according to claim 1, wherein the drive element is a belt or a positive drive belt.

11. An overhead conveyor according to claim 10, wherein the drive belt is passed over drive and terminal rollers arranged close to the ends of the straight girder portions, and of which at least one driver roller is driven by a motor via a belt transmission.

12. An overhead conveyor as claimed in claim 11, wherein the driver motor is connectible to a drive roller, arranged at a distance therefrom, for a second drive belt by means of flexible shaft.

\* \* \* \* \*